(No Model.)  2 Sheets—Sheet 1.
N. J. PRITCHARD.
ROTARY ENGINE.
No. 286,844.  Patented Oct. 16, 1883.
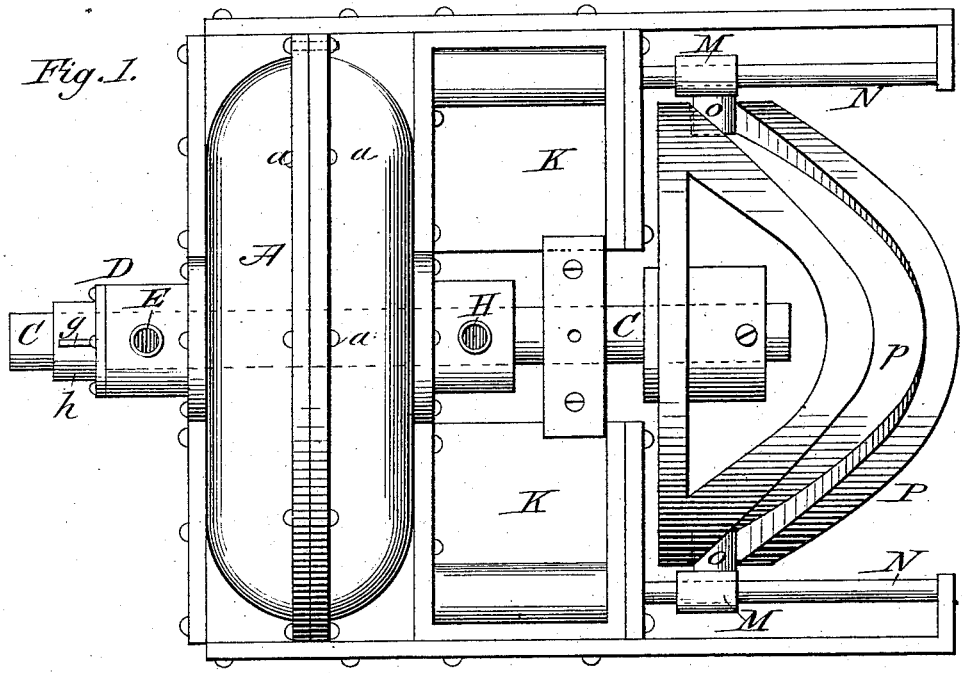
Fig. 1.
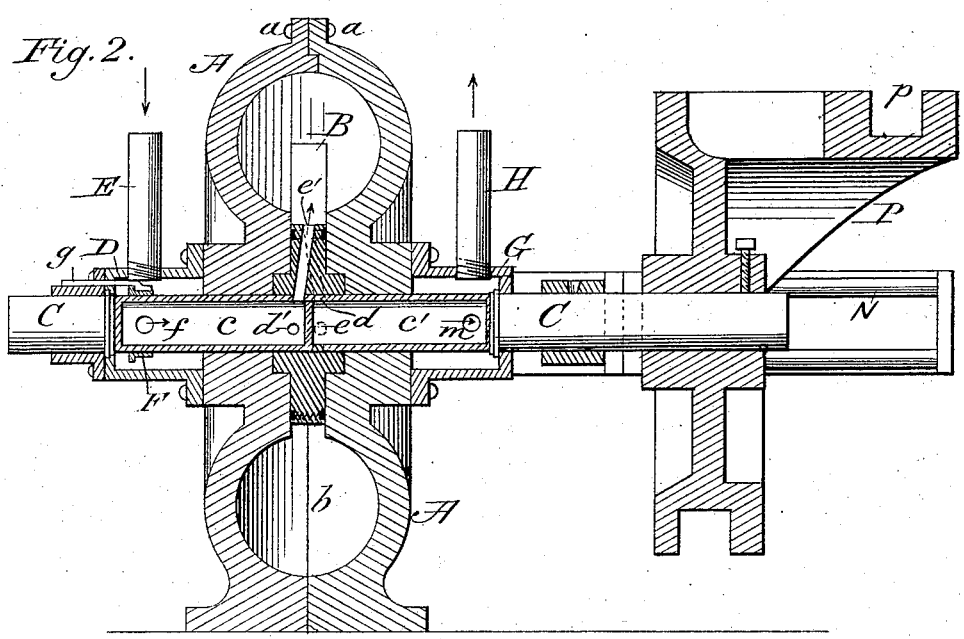
Fig. 2.
Fig. 5.
Attest:
F. H. Schott
A. R. Brown
Inventor:
Nathaniel J. Pritchard (No Model.) 2 Sheets—Sheet 2.

N. J. PRITCHARD.
ROTARY ENGINE.

No. 286,844. Patented Oct. 16, 1883.

Attest:
F. H. Schott
A. R. Brown

Inventor:
Nathaniel J. Pritchard
per J. C. Tasker atty

United States Patent Office.

NATHANIEL J. PRITCHARD, OF BOYCE, VIRGINIA, ASSIGNOR OF THREE-FOURTHS TO DAVID E. CLARK, OF CHAMBERSBURG, PENNSYLVANIA, AND CHARLES L. PAGENHART, OF BOYCE, VIRGINIA.

ROTARY ENGINE.

SPECIFICATION forming part of Letters Patent No. 286,844, dated October 16, 1883.

Application filed March 29, 1883. (No model.)

*To all whom it may concern:*

Be it known that I, NATHANIEL J. PRITCHARD, a citizen of the United States, residing at Boyce, in the county of Clarke and State of Virginia, have invented certain new and useful Improvements in Rotary Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the rotary engine for which Letters Patent of the United States No. 268,722 were granted to Charles L. Pagenhart, December 5, 1882; and the invention consists in providing a rotary engine with a hollow shaft having inlet and outlet ports for the passage of steam to and from the chamber in which the rotary piston is arranged; and, further, in certain novel features of construction, as hereinafter more fully described and claimed.

Figure 3:
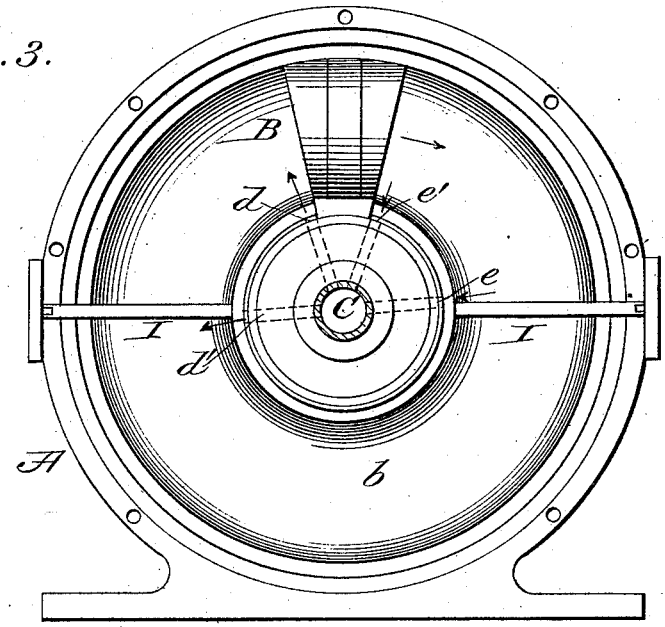
Figures 4, 6:
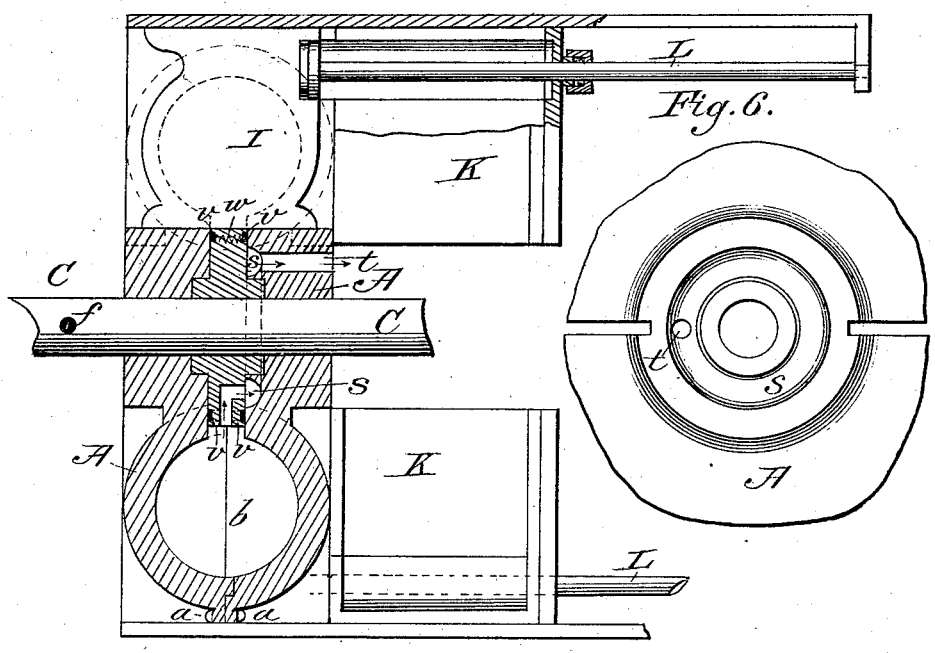
Figure 7:
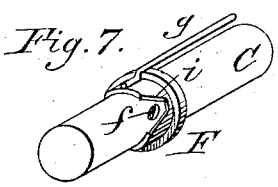

In the annexed drawings, illustrating my invention, Figure 1 is a plan view of my improved rotary engine. Fig. 2 is a central longitudinal section. Fig. 3 is an interior view of the cylinder or casing, showing a side view of the rotary piston and end views of the sliding cylinder heads or plates. Fig. 4 is a horizontal section illustrating a modification in the arrangement of the steam-ports. Fig. 5 is a partial side view. Fig. 6 is an interior view of the cylinder constructed to correspond with the arrangement of ports shown in Fig. 4. Fig. 7 is a perspective view of my improved cut-off.

Like letters of reference indicate like parts in the several views.

The cylinder A is composed of two flanged and rabbeted halves connected by bolts $a\ a$ to form a tight joint, as shown, the interior of the cylinder presenting a rounded space or chamber, $b$, in which is fitted a rotary piston, B, that is keyed to a shaft, C, which passes through the center of the cylinder-chamber. The cylinder A may be supported in any suitable manner, but is preferably provided with a broad base, and made of such weight as to steady and support the moving parts of the engine. That part or end of the shaft C which passes through the cylinder A is made hollow, or provided with passages or chambers $c\ c'$, as shown in Fig. 2, for the passage of steam to or from the cylinder. The hub of the piston B is provided with two inlet-ports, $d\ d'$, communicating with the chamber $c$, and two exhaust-ports, $e\ e'$, communicating with the chamber $c'$. The chamber $c$ is inclosed in a steam-chest, D, and is provided with ports $f f$, through which steam is admitted, the steam-chest being provided with a feed-pipe, E, as shown in Figs. 1 and 2. A cut-off consisting of a notched ring, F, is arranged to surround the hollow shaft C over or near the ports $f\ f$, and is provided with a shank or stem, $g$, that projects through a steam-tight opening in the end of the steam-chest D, and passes through the bearing $h$, so as to be under the control of the attendant. The inner edge of the ring F is provided with notches $i\ i$, so arranged that when the ring is pushed in to cover the ports $f f$, steam will be cut off at intervals as the ports pass beneath the ring between the notches, thus economizing steam. If a full head of steam is required, the cut-off may be adjusted by withdrawing the ring, so as to entirely uncover the ports $f\ f$, and permit an uninterrupted passage of steam to the chamber $c$ and through the ports $d\ d'$ to the cylinder. The chamber $c'$ is inclosed in a box or chest, G, into which the exhaust-steam passes through posts $m\ m$ after escaping from the cylinder through the ports $e\ e'$, the box or chest G being provided with an exhaust-pipe, H, through which the exhaust-steam finally escapes, as shown in Fig. 2.

A foothold for the expansion of steam against the piston B is afforded by the sliding heads or plates I I, that are alternately projected across the annular chamber $b$. These plates are arranged to slide in shallow chambers K K, that communicate with the interior of the cylinder through narrow slits or openings in one-half of the cylinder, the plates I I being attached to rods L L, carried by cross-heads M M, that slide on guide-rods N N. The cross-heads M M are each provided with a roller, o, that engages with a groove, p, in a cam, P, carried by the shaft C, so that as the cam is rotated the sliding plates I I will be alternately projected into and withdrawn from the cylinder to serve as a foothold for the expansion of steam in actuating the piston and shaft. The form of these sliding plates, as well as the manner of packing and operating them, is the same as shown in the patent to Pagenhart, above referred to, and need not be further described.

When it is desired to reverse the engine or change the direction in which the piston B is rotated, the pipe H will be used as a steam-inlet and the pipe E as an exhaust, the functions of the intermediate ports being reversed for the time.

If desired, the chamber $c'$ in the shaft C may be dispensed with, and the exhaust-steam made to pass through the hub of the piston into an annular groove, s, in one-half of the cylinder, and thence through a port, t, in the cylinder-casing, as shown in Figs. 4 and 6.

The hub of the piston B is provided on each side with an annular groove or recess, in which is set a packing-ring, v, that may be made to bear outward against the cylinder or casing, so as to effectually pack the joint between it and the piston-hub without impeding the movement of the piston. This is accomplished by drilling small passages through the hub from one packing-ring to the other at suitable intervals, as shown by dotted lines in Figs. 2 and 4, so that a sufficient quantity of steam can pass into said passages or openings to press the packing-rings outward; or, if desired, a spiral spring, w, may be placed in each of said openings, so that its ends will bear outward against the packing-rings for the same purpose.

Having thus described my invention, what I claim as new, and desire to secure by Letters Patent, is—

1. The combination, in a rotary engine, of the cylinder A, the shaft C, having chambers $c$ $c'$ and ports $f$ $f$ and $m$ $m$, the rotary piston B, keyed to said shaft, and having ports $d$ $d'$ and $e$ $e'$, the chests D G, pipes E H, sliding plates I I, rods L L, cross-heads M M, guides N N, and cam P, substantially as shown and described.

2. In a rotary engine, the combination of the cylinder A, the hollow shaft C, having suitable ports, the piston B, keyed to said shaft, and having a hub provided with ports that communicate with the hollow shaft, the steam-chest D, surrounding the end of said shaft, and the cut-off F, provided with a stem, $g$, and having notches $i$ $i$ on one edge, substantially as shown and described.

3. In a rotary engine, the combination of the cylinder A, the hollow shaft C, having suitable ports, the rotary piston B, keyed thereto, and having a hub containing steam-ports, and provided on each side with an annular groove or recess, with openings drilled through said hub from one of said grooves to the other, the packing-rings $v$ $v$, set in said grooves, and the springs $w$ $w$, adapted to press the rings outward to form close joints, substantially as shown and described.

In testimony whereof I affix my signature in presence of two witnesses.

NATHANIEL J. PRITCHARD.

Witnesses:
A. R. BROWN,
PHILIP MAURO.